(12) United States Patent
Hsu et al.

(10) Patent No.: US 6,976,868 B2
(45) Date of Patent: Dec. 20, 2005

(54) ORNAMENTAL PLATE MOUNTING STRUCTURE

(75) Inventors: Ming-Chun Hsu, Taipei (TW); Hsien-Pin Tsou, Taipei (TW); Bo-Shiun Luo, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/866,778

(22) Filed: Jun. 15, 2004

(65) Prior Publication Data

US 2005/0186836 A1    Aug. 25, 2005

(30) Foreign Application Priority Data

Feb. 19, 2004 (TW) .............................. 93202379 U

(51) Int. Cl.⁷ .............................................. H01R 3/00
(52) U.S. Cl. ...................................................... 439/491
(58) Field of Search ................................ 439/491, 488; 174/50, 56, 45 R, 35 GC, 66; 361/681, 683; 220/3.8, 313, 251, 246; 312/223

(56) References Cited

U.S. PATENT DOCUMENTS

| | | | | |
|---|---|---|---|---|
| 3,094,238 A | * | 6/1963 | Davidson | 220/251 |
| 3,194,427 A | * | 7/1965 | Mullett et al. | 220/246 |
| 3,902,625 A | * | 9/1975 | Schmidhuber | 220/246 |
| 4,647,725 A | * | 3/1987 | Dellinger et al. | 379/26.01 |
| 5,255,810 A | * | 10/1993 | Hosford | 220/243 |
| 5,433,333 A | * | 7/1995 | Martell | 220/243 |
| 5,594,206 A | * | 1/1997 | Klas et al. | 174/56 |
| 6,104,605 A | * | 8/2000 | Lee | 361/681 |
| 6,400,562 B1 | * | 6/2002 | Lee et al. | 361/683 |
| 6,683,247 B1 | * | 1/2004 | McTavish et al. | 174/45 R |

* cited by examiner

Primary Examiner—Alexander Gilman
(74) Attorney, Agent, or Firm—Bacon & Thomas PLLC

(57) ABSTRACT

An ornamental plate mounting structure includes an electric apparatus, which has a mounting hole in the face panel thereof, an ornamental plate, which has one locating hole in the inner surface thereof, and a connector, which has a front mounting portion and a rear mounting portion respectively press-fitted into the locating hole of the ornamental plate and the mounting hole of the face panel of the electric apparatus to secure the ornamental plate to the face panel of the electric apparatus.

4 Claims, 4 Drawing Sheets

ORNAMENTAL PLATE MOUNTING STRUCTURE

BACKGROUND OF THE INVENTION

1. Field of the Invention

The present invention relates to an ornamental plate mounting structure and more particularly, to such an ornamental plate mounting structure, which is suitable for use to fasten an ornamental plate to the face panel of an electric apparatus.

2. Description of Related Art

Regular electronic apparatuses, for example, a DVD player and a multimedia computer, may use an ornamental plate to decorate the face panel because the plate has an attractive finish not possible with the face panel, thereby attracting consumers to buy the product.

Conventionally, the ornamental plate is fastened to the face panel by glue or screws. An ornamental plate of screw mounting design must have through holes for the mounting of screws. Because screws are inserted into the through holes of the ornamental plate from the front side of the ornamental plate and then threaded into corresponding screw holes in the face panel, the screws are not kept from sight when installed. The exposed part of the screws destroys the sense of beauty of the ornamental plate and the face panel of the electric apparatus, thereby putting potential purchasers off. If glue is used to bond an ornamental plate to the face panel of an electric apparatus, the ornamental plate may fall from the face panel after long term use of the electric apparatus due to deterioration of material quality of the glue. Furthermore, due to its low bond strength, glue is not practical for use to bond a heavy ornamental plate to the face panel of an electric apparatus.

SUMMARY OF THE INVENTION

The present invention has been accomplished under the circumstances in view. It is therefore the main object of the present invention to provide an ornamental plate mounting structure, which keeps the aesthetically appealing outer appearance of the face panel intact.

It is another object of the present invention to provide an ornamental plate mounting structure, which keeps the connection between the ornamental plate and the face panel tight.

It is still another object of the present invention to provide an ornamental plate mounting structure, which eliminates the use of glue, whereby otherwise eventual separation of the ornamental plate from the face panel after long term use is eliminated.

To achieve these and other objects of the present invention, the ornamental plate mounting structure comprises an electric apparatus, the electric apparatus having a face panel, the face panel having an outer surface and at least one mounting hole extended through the outer surface; an ornamental plate, the ornamental plate having an inner surface and at least one locating hole formed in the inner surface corresponding to the at least one mounting hole of the face panel; and at least one connector adapted to secure the ornamental plate to the face panel of the electric apparatus, the at least one connector each comprising a front mounting portion press-fitted into one locating hole of the ornamental plate and a rear mounting portion press-fitted into one mounting hole of the face panel.

DETAILED DESCRIPTION OF THE PREFERRED EMBODIMENT

Figure 1:
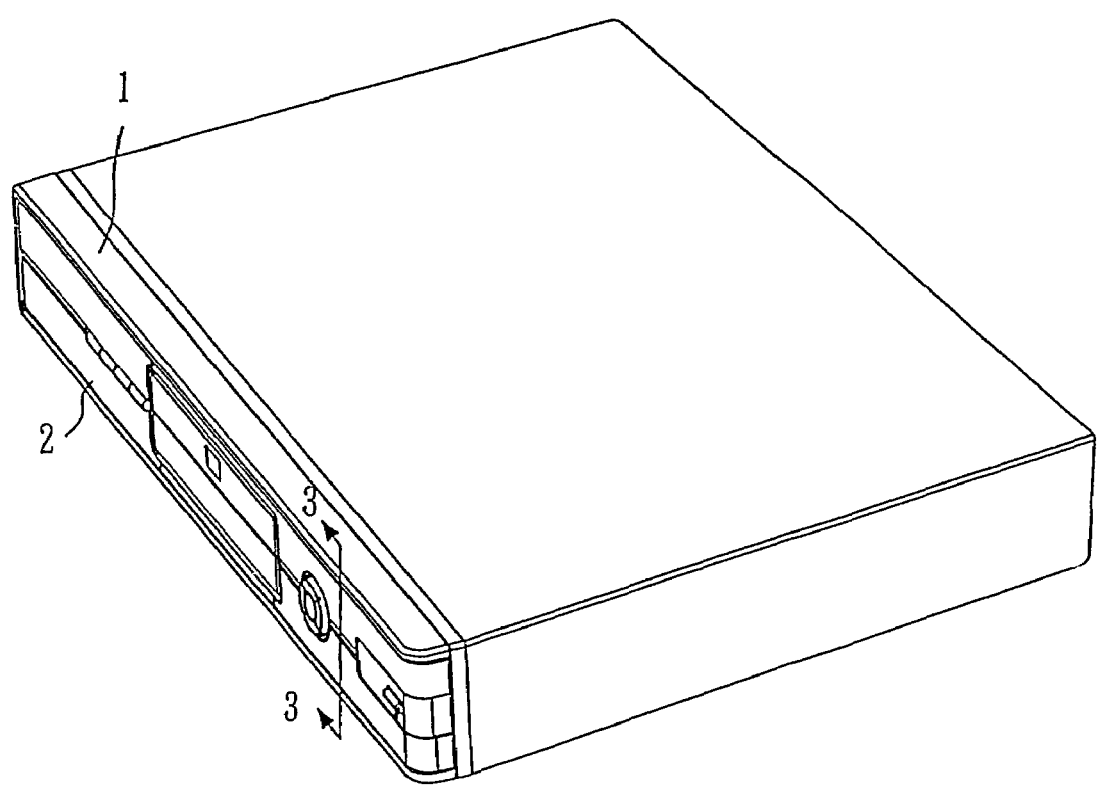
FIG. 1 is an applied view of the present invention, showing an aluminum ornamental plate installed in the face panel of an electronic apparatus.
Figure 2:
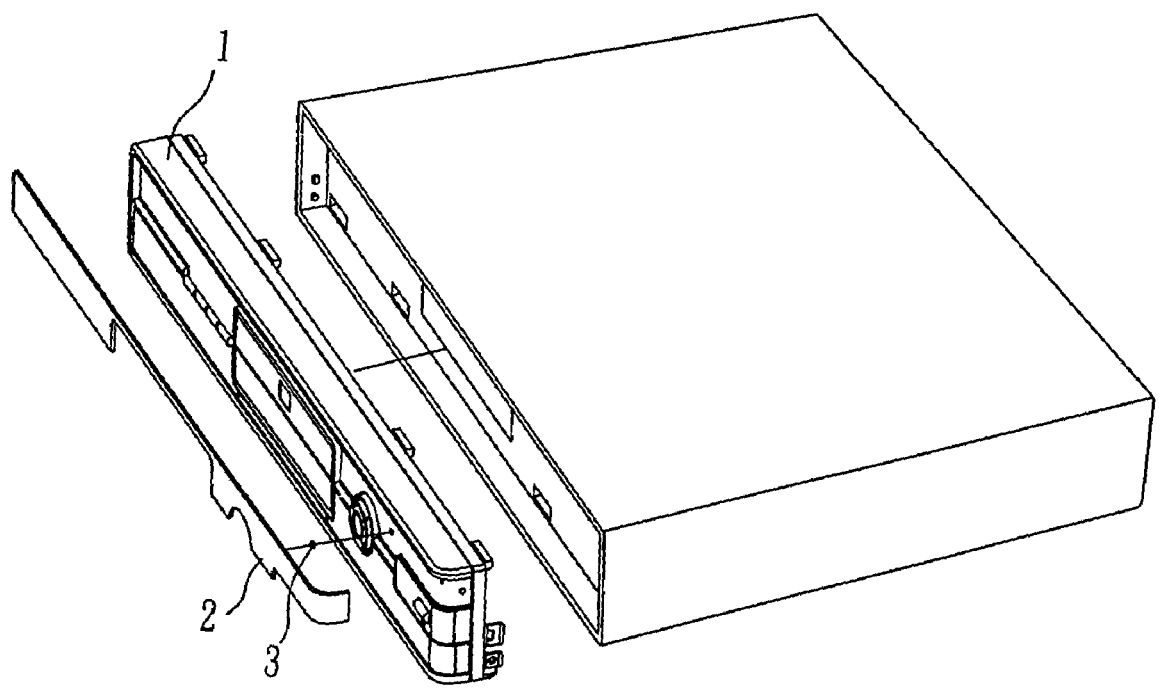
FIG. 2 is an exploded view of the preferred embodiment of the present invention.
Figure 3:
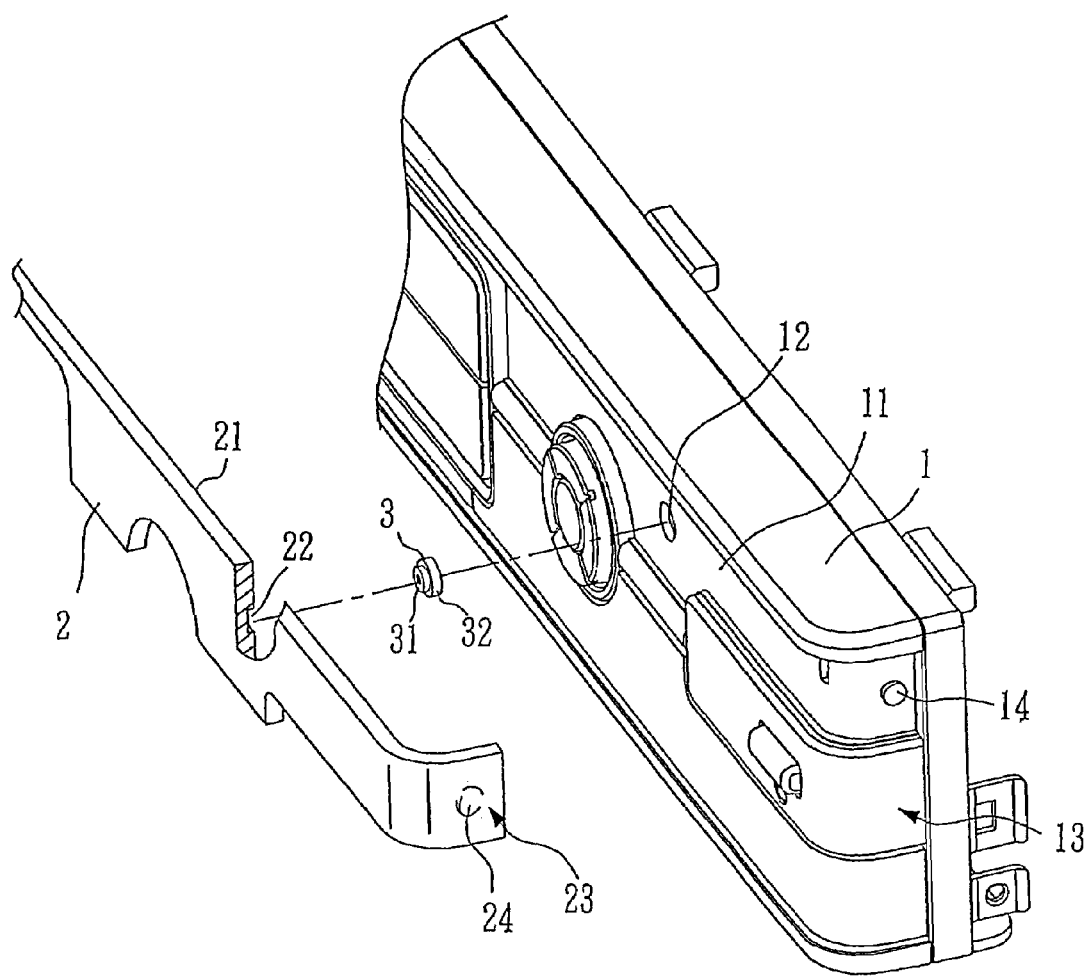
FIG. 3 is an enlarged view of a part of FIG. 2.

Referring to FIGS. 2 and 3, an ornamental plate mounting structure in accordance with the present invention is shown comprising a multimedia computer (MCPC), an aluminum ornamental plate 2, and a connector 3. The multimedia computer (MCPC) comprises a face panel 1. The face panel 1 has an outer surface 11, a side strip 13 raised from the outer surface 11 at one lateral side, a stub rod 14 protruded from the outer surface 11 and spaced above the side strip 13, and a mounting hole 12 extended through the outer surface 11. The aluminum ornamental plate 2 has an inner surface 21, a bend 23 backwardly extended from one lateral side, a recessed locating hole 22 formed in the inner surface 21 corresponding to the mounting hole 12 of the face panel 1, and a retaining hole 24 formed in the bend 23 and adapted to receive the stub rod 14.

Figure 4:
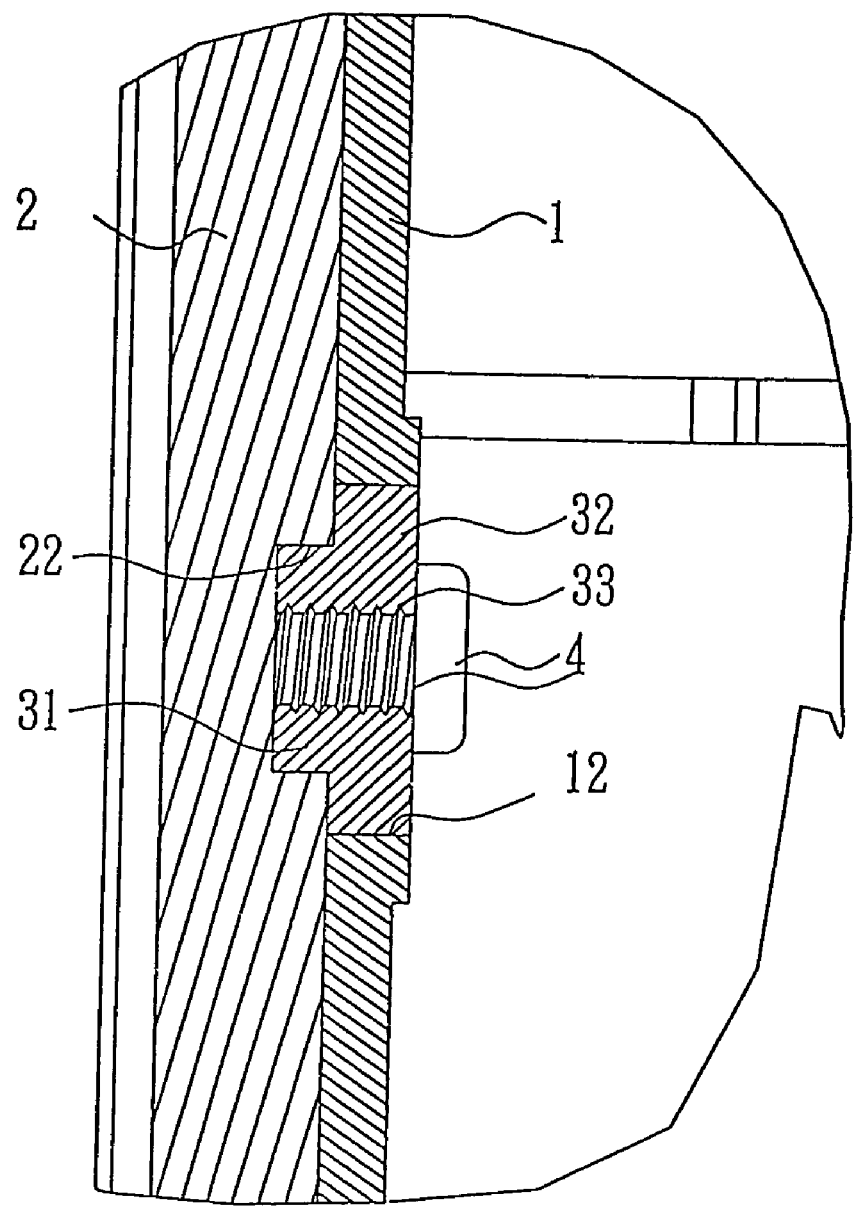
FIG. 4 is a sectional view showing the connector connected between the face panel and the aluminum ornamental plate.

Referring to FIG. 4 and FIG. 3 again, the connector 3 comprises a front mounting portion 31 press-fitted into the recessed locating hole 22 of the aluminum ornamental plate 2, and a rear mounting portion 32 press-fitted into the mounting hole 12 of the face panel 1. The connector 3 further comprises a screw hole 33 axially extended through the front mounting portion 31 and the rear mounting portion 32. After the front mounting portion 31 and rear mounting portion 32 of the connector 3 have been respectively press-fitted into the recessed locating hole 22 of the aluminum ornamental plate 2 and the mounting hole 12 of the face panel 1, a tightening up screw 4 is threaded into the screw hole 33 of the connector 3 in direction from the inside of the multimedia computer MCPC toward the aluminum ornamental plate 2 to tighten the connection, wherein the diameter of said tightening up screw is slightly larger than the diameter of said screw hole. (see FIG. 4).

As indicated above, the connection between the face panel 1 and the aluminum ornamental plate 2 eliminates the use of glue. Therefore, the connection between the face panel 1 and the aluminum ornamental plate 2 is *free from the variation of ambient temperature. Further, because the tightening up screw 4 is concealed, the outer appearance of the assembly of the face panel 1 and the aluminum ornamental plate 2 is not spoiled. Although the present invention has been explained in relation to its preferred embodiment, it is to be understood that many other possible modifications and variations can be made without departing from the spirit and scope of the invention as hereinafter claimed.

What is claimed is:

1. An ornamental plate mounting structure comprising:
   an electric apparatus, said electric apparatus having a face panel, said face panel having an outer surface and at least one mounting hole extended through said outer surface;
   an ornamental plate said ornamental plate having an inner surface and at least one locating hole formed in said inner surface corresponding to the at least one mounting hole of said face panel; and at least one connector adapted to secure said ornamental plate to the face panel of said electric apparatus, said at least one connector each comprising a front mounting portion press-fitted into one locating hole of said ornamental plate and a rear mounting portion press-fitted into one mounting hole of said face panel;

wherein said electric apparatus further comprises a side strip and at least one stub rod protruded above said side strip; said ornamental plate further comprises a bend curved from one lateral side thereof, said bend having at least one retaining hole formed in an inner surface thereof and respectively coupled to the at least one stub rod of the side strip of said electric apparatus.

2. The ornamental plate mounting structure as claimed in claim 1, wherein each said mounting hole of said face panel is a through hole; said at least one connector each further comprises a screw hole axially extended through the front mounting portion and rear mounting portion thereof for receiving a tightening up screw after insertion of the front mounting portion and rear mounting portion into the corresponding locating hole in said ornamental plate and the corresponding mounting hole of said face panel, wherein the diameter of said tightening up screw is slightly larger than the diameter of said screw hole.

3. The ornamental plate mounting structure as claimed in claim 1, wherein said ornamental plate is an aluminum plate.

4. The ornamental plate mounting structure as claimed in claim 1, wherein said electric apparatus is a multimedia computer.

* * * * *